(12) United States Patent
Blanz et al.

(10) Patent No.: US 8,320,499 B2
(45) Date of Patent: Nov. 27, 2012

(54) DYNAMIC SPACE-TIME CODING FOR A COMMUNICATION SYSTEM

(75) Inventors: Josef J. Blanz, Wachenheim (DE); Hans Dieter Schotten, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 722 days.

(21) Appl. No.: 11/367,067

(22) Filed: Mar. 3, 2006

(65) Prior Publication Data

US 2006/0209749 A1 Sep. 21, 2006

Related U.S. Application Data

(60) Provisional application No. 60/663,516, filed on Mar. 18, 2005, provisional application No. 60/710,420, filed on Aug. 22, 2005.

(51) Int. Cl.
*H03K 9/00* (2006.01)
(52) U.S. Cl. ........ 375/316; 375/295; 375/347; 375/267; 375/146; 370/328; 370/338
(58) Field of Classification Search .................. 375/295
See application file for complete search history.

(56) References Cited

U.S. PATENT DOCUMENTS

| | | | |
|---|---|---|---|
| 6,188,736 B1 * | 2/2001 | Lo et al. .................... | 375/347 |
| 6,298,092 B1 | 10/2001 | Heath, Jr. et al. | |
| 6,788,661 B1 * | 9/2004 | Ylitalo et al. .............. | 370/334 |
| 6,804,307 B1 | 10/2004 | Popovic | |
| 7,058,363 B2 * | 6/2006 | Hottinen et al. ............ | 455/69 |
| 7,136,427 B2 * | 11/2006 | Niida et al. ................. | 375/299 |
| 2002/0085643 A1 | 7/2002 | Kitchener et al. ........... | 375/267 |
| 2002/0165626 A1 * | 11/2002 | Hammons et al. ........... | 700/53 |

(Continued)

FOREIGN PATENT DOCUMENTS

EP 1367760 12/2003

(Continued)

OTHER PUBLICATIONS

Ching-Shyang Maa et al., "Low-complexity channel-adapted space-time coding schemes for frequency-selective wireless MIMO channels." Vehicular Technology Conference, 2003, VTC 2003-Fall. 2003 IEEE 58th Orlando, FL, USA Oct. 6-9, 2003, Piscataway, NJ, USA, IEEE, US, Oct. 6, 2003, pp. 518-522 vol. 1.

(Continued)

*Primary Examiner* — Lihong Yu
(74) *Attorney, Agent, or Firm* — Howard H. Seo

(57) ABSTRACT

Techniques for transmitting data with dynamic space-time coding are described. Dynamic space-time coding refers to the mapping of data across both space and time dimensions based on a mapping scheme that changes in a dynamic manner, e.g., a time-variant manner. A transmitter generates at least one data stream and performs space-time coding on the at least one data stream in a dynamic manner to generate at least two output streams for transmission from at least two antennas. The space-time coding may be performed in various manners. For example, each data stream may be space-time coded based on a respective set of space-time codes, e.g., by cycling through the space-time codes in the code set or by using a space-time code selected based on feedback from a receiver. The code set for each data stream may also be selected from among multiple code sets available for the data stream.

33 Claims, 10 Drawing Sheets

U.S. PATENT DOCUMENTS

| | | | |
|---|---|---|---|
| 2003/0022636 A1 | 1/2003 | Ylitalo et al. | 455/101 |
| 2006/0018403 A1* | 1/2006 | Wang et al. | 375/299 |
| 2007/0177732 A1* | 8/2007 | Schotten et al. | 380/215 |

FOREIGN PATENT DOCUMENTS

| | | |
|---|---|---|
| JP | 2003528527 A | 10/2003 |
| JP | 2003530010 | 10/2003 |
| JP | 2007528634 T | 10/2007 |
| TW | 586280 | 5/2004 |
| WO | 0165760 | 9/2001 |
| WO | 02082689 A2 | 10/2002 |
| WO | 02098051 | 12/2002 |
| WO | 03084253 A1 | 10/2003 |
| WO | 03085875 | 10/2003 |
| WO | 2005011146 A1 | 2/2005 |

OTHER PUBLICATIONS

International Search Report and Written Opinion—PCT/US2006/010086, International Search Authority—European Patent Office—Jun. 27, 2006.

Taiwanese Search Report—TW095109273—Search Authority—TIPO—Dec. 16, 2008.

* cited by examiner

DYNAMIC SPACE-TIME CODING FOR A COMMUNICATION SYSTEM

CLAIM OF PRIORITY UNDER 35 U.S.C §119

The present Application for Patent claims priority to Provisional Application Ser. No. 60/663,516, entitled "PSEUDO RANDOM SPACE-TIME (ST) CODING," filed Mar. 18, 2005, and Provisional Application Ser. No. 60/710,420, entitled "DYNAMIC SPACE-TIME CODING FOR A COMMUNICATION SYSTEM," filed Aug. 22, 2005, both assigned to the assignee hereof, and expressly incorporated herein by reference.

BACKGROUND

I. Field

The present disclosure relates generally to communication, and more specifically to techniques for transmitting data in a communication system.

II. Background

A cellular system is a wireless multiple-access communication system that can concurrently communicate with multiple terminals, e.g., cellular phones. A cellular system may employ space-time coding in order to achieve space and time diversity for a transmission to a terminal. Space-time coding refers to processing of data (e.g., a modulation symbol) such that the data is sent via multiple physical antennas and across time to achieve both space and time diversity. For example, a third generation (3G) cellular system may employ a space-time coding scheme such as space-time transmit diversity (STTD) or orthogonal transmit diversity (OTD) to transmit each pair of symbols from two antennas in two symbol periods. STTD and OTD are different but fixed schemes for mapping two symbols to two antennas in two symbol periods. STTD and OTD generally improve performance over the case in which space-time coding is not employed.

However, STTD and OTD have several major drawbacks. First, STTD and OTD typically suffer performance loss in time dispersive multipath environments, which cause frequency selective fading and loss of orthogonality. Second, STTD and OTD are limited to operation on two transmit antennas. Third, STTD and OTD are fixed space-time codes. In some scenarios, such as for a stationary or slow moving terminal, the wireless channel may be in a state that does not match very well with the fixed space-time code for STTD or OTD and may remain in this bad state for an extended period of time. All of these drawbacks limit the use of and/or hamper the performance of STTD and OTD.

There is therefore a need in the art for transmission techniques that can provide good performance in multipath environments.

SUMMARY

Techniques for transmitting data with dynamic space-time coding are described herein. These techniques may provide higher degrees of diversity for a data transmission to a receiver without using any feedback or only a small amount of feedback from the receiver.

According to an embodiment of the invention, an apparatus is described which includes at least one processor and a memory. The at least one processor generates at least one data stream and performs space-time coding on the at least one data stream in a dynamic manner (e.g., a time-variant manner) to generate at least two output streams for transmission from at least two antennas. The memory stores data and/or program codes for the at least one processor.

According to another embodiment, a method is provided in which at least one data stream is generated. Space-time coding is then performed on the at least one data stream in a dynamic manner to generate at least two output streams for transmission from at least two antennas.

According to yet another embodiment, an apparatus is described which includes means for generating at least one data stream and means for performing space-time coding on the at least one data stream in a dynamic manner to generate at least two output streams for transmission from at least two antennas.

According to yet another embodiment, an apparatus is described which includes at least one processor and a memory. The at least one processor obtains at least one received symbol stream for at least one receive antenna and performs space-time decoding on the at least one received symbol stream to obtain at least one space-time decoded symbol stream, which is an estimate of at least one data stream transmitted with dynamic space-time coding. The space-time decoding is complementary to the space-time coding. The memory stores data and/or program codes for the at least one processor.

According to yet another embodiment, a method is provided in which at least one received symbol stream is obtained for at least one receive antenna. Space-time decoding is then performed on the at least one received symbol stream, in a manner complementary to the dynamic space-time coding performed by a transmitter, to obtain at least one space-time decoded symbol stream.

According to yet another embodiment, an apparatus is described which includes means for obtaining at least one received symbol stream for at least one receive antenna and means for performing space-time decoding on the at least one received symbol stream in a manner complementary to the dynamic space-time coding performed by a transmitter to obtain at least one space-time decoded symbol stream.

Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Techniques for transmitting data with dynamic space-time coding are described herein. Dynamic space-time coding refers to the mapping of data across both space and time dimensions based on a mapping scheme that changes in a dynamic manner. For example, the mapping scheme may change in a time-variant manner by using different space-time codes in different time intervals, where the space-time codes may be selected with or without feedback from a receiver. As another example, the mapping scheme may change based on occurrences of events, e.g., expiration of timers, deteriorating performance such as increasing packet error rates, and so on. The mapping scheme may also change in a dynamic manner by using different codes, (e.g., convolutional or Turbo codes) for different transmit antennas. The various manners in which space-time coding might be varied dynamically are described in detail below.

The techniques described herein may be used for multiple-input multiple-output (MIMO) and multiple-input single-output (MISO) transmissions. A MIMO transmission is a transmission from multiple (T>1) transmit antennas to multiple receive (R>1) antennas. A MISO transmission is a transmission from multiple (T>1) transmit antennas to a single (R=1) receive antenna. The techniques may be used to send one or multiple data streams from a transmitter to a receiver. The number of data streams (D) that may be sent simultaneously to a given receiver is determined by the number of antennas (T) at the transmitter and the number of antennas (R) at the terminal, or $D \leq \min\{T, R\}$.

The techniques described herein may be used for transmission on the downlink and uplink. The downlink (or forward link) refers to the communication link from a base station to a terminal, and the uplink (or reverse link) refers to the communication link from a terminal to a base station. A base station is generally a fixed station and may also be called a base transceiver system (BTS), a Node B, an access point, or some other terminology. A terminal may be fixed or mobile and may be a wireless device, a cellular phone, a personal digital assistant (PDA), a wireless modem card, and so on. For clarity, the techniques are described below for transmission on the downlink.

Figure 1:
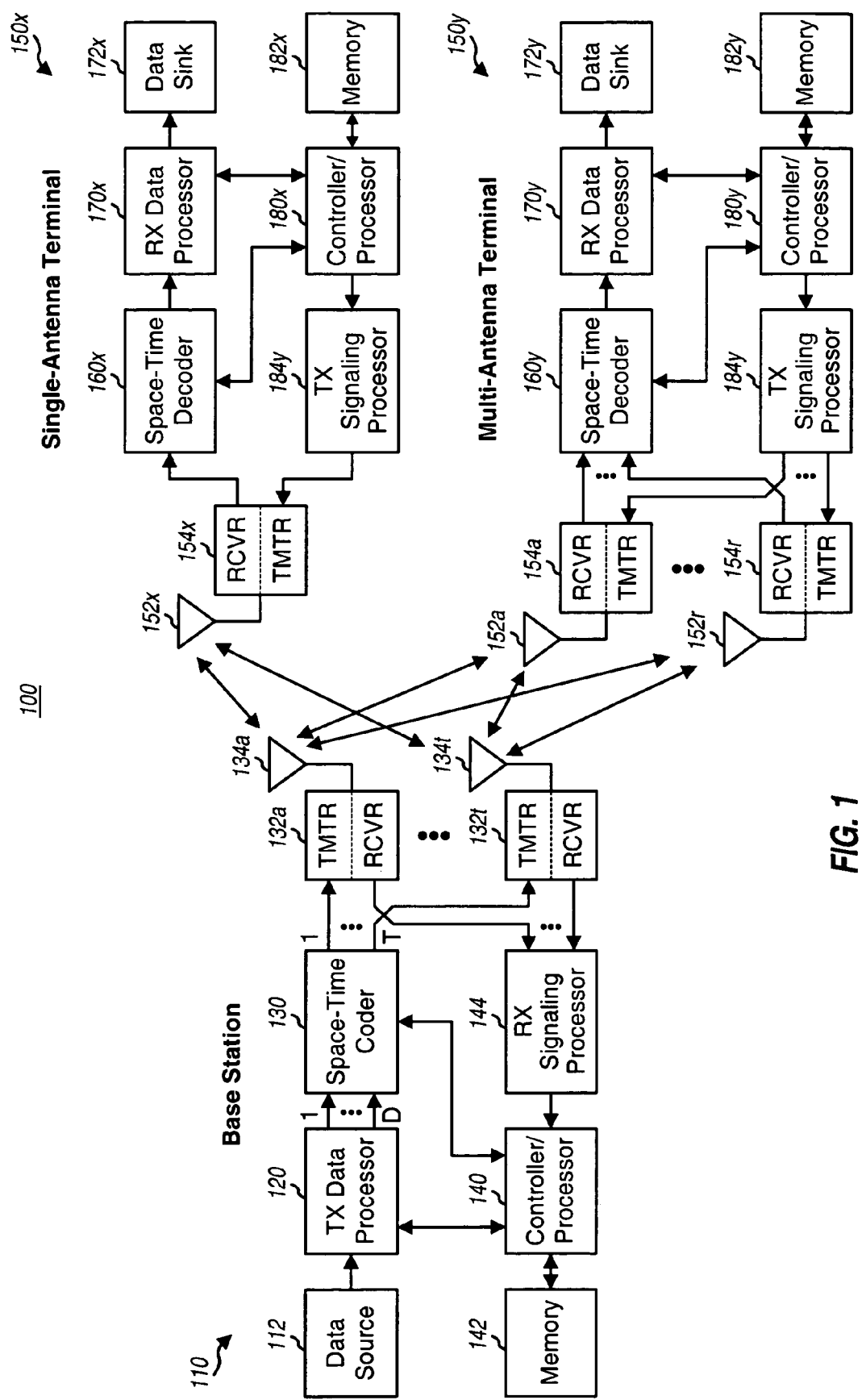
FIG. 1 shows a block diagram of a base station and two terminals.

FIG. 1 shows a block diagram of an embodiment of a base station 110 and two terminals 150x and 150y in a wireless communication system 100. Base station 110 is equipped with multiple (T>1) antennas 134a through 134t, terminal 150x is equipped with a single (R=1) antenna 152x, and terminal 150y is equipped with multiple (R>1) antennas 152a through 152r. For simplicity, FIG. 1 shows only the processing units for data transmission on the downlink and signaling transmission on the uplink.

At base station 110, a transmit (TX) data processor 120 receives traffic data from a data source 112, processes (e.g., channel encodes, interleaves, and modulates) the traffic data, and generates one or more (D≧1) data streams. Each data stream may be channel encoded separately based on a convolutional code, a Turbo code, a block code, or a combination thereof. Alternatively, a single input stream may be channel encoded and then demultiplexed into D data streams. A space-time coder 130 performs space-time coding on the D data streams, as described below, and provides multiple (T) output streams to T transmitters (TMTRs) 132a through 132t. The space-time coding may be selectively performed (e.g., for certain terminals, certain types of data, certain physical channels, certain time slots, certain channel conditions, and so on) or may be performed all the time. The space-time coding may also be performed in the same or different man-ners for single-antenna terminal 150x and multi-antenna terminal 150y. Each transmitter 132 processes (e.g., converts to analog, filters, amplifies, and frequency upconverts) its output stream and generates a radio frequency (RF) modulated signal. The RF modulated signals from transmitters 132a through 132t are transmitted from antennas 134a through 134t, respectively.

At each terminal 150, one or multiple antennas 152 receive the transmitted signals, and each antenna provides a received signal to a respective receiver (RCVR) 154. Each receiver 154 processes (e.g., filters, amplifies, frequency downconverts, digitizes, potentially equalizes) its received signal and provides a stream of received symbols. For single-antenna terminal 150x, a space-time decoder 160x performs space-time decoding on the received symbols and provides space-time decoded symbols. The space-time decoding might also be combined with an equalizer. A receive (RX) data processor 170x then processes (e.g., demodulates, deinterleaves, and channel decodes) the space-time decoded symbols and provides decoded data to a data sink 172x. For multi-antenna terminal 150y, a space-time decoder 160y performs space-time decoding on the received symbols and provides space-time decoded symbols. An RX data processor 170y then processes the space-time decoded symbols and provides decoded data to a data sink 172y.

Terminal 150x and/or 150y may send signaling to base station 110. For each terminal, a TX signaling processor 184 may receive signaling from a controller/processor 180 and may then process the signaling in accordance with a selected signaling scheme. The processed signaling is conditioned by one or more transmitters 154 and transmitted via one or more antennas 152. At base station 110, the signals from terminals 150x and/or 150y are received by antennas 134a through 134t, processed by receivers 132a through 132t, and further processed by an RX signaling processor 144 to recover the signaling (if any) sent by terminals 150x and/or 150y. A controller/processor 140 may control the transmission of data to terminals 150x and 150y based on the recovered signaling.

Controllers/processors 140, 180x and 180y control the operation of various processing units at base station 110 and terminals 150x and 150y, respectively. Memories 142, 182x and 182y store data and program codes for base station 110 and terminals 150x and 150y, respectively.

Base station 110 may utilize space-time coding to improve performance for data transmission to single-antenna terminal 150x and multi-antenna terminal 150y. In an embodiment, base station 110 performs space-time coding based on one or more (M≧1) sets of space-time codes. Each code set includes multiple space-time codes. Each space-time code defines a specific mapping of symbols to transmit antennas and symbol periods. Base station 110 may perform space-time coding in various manners, as described below.

Figure 2:
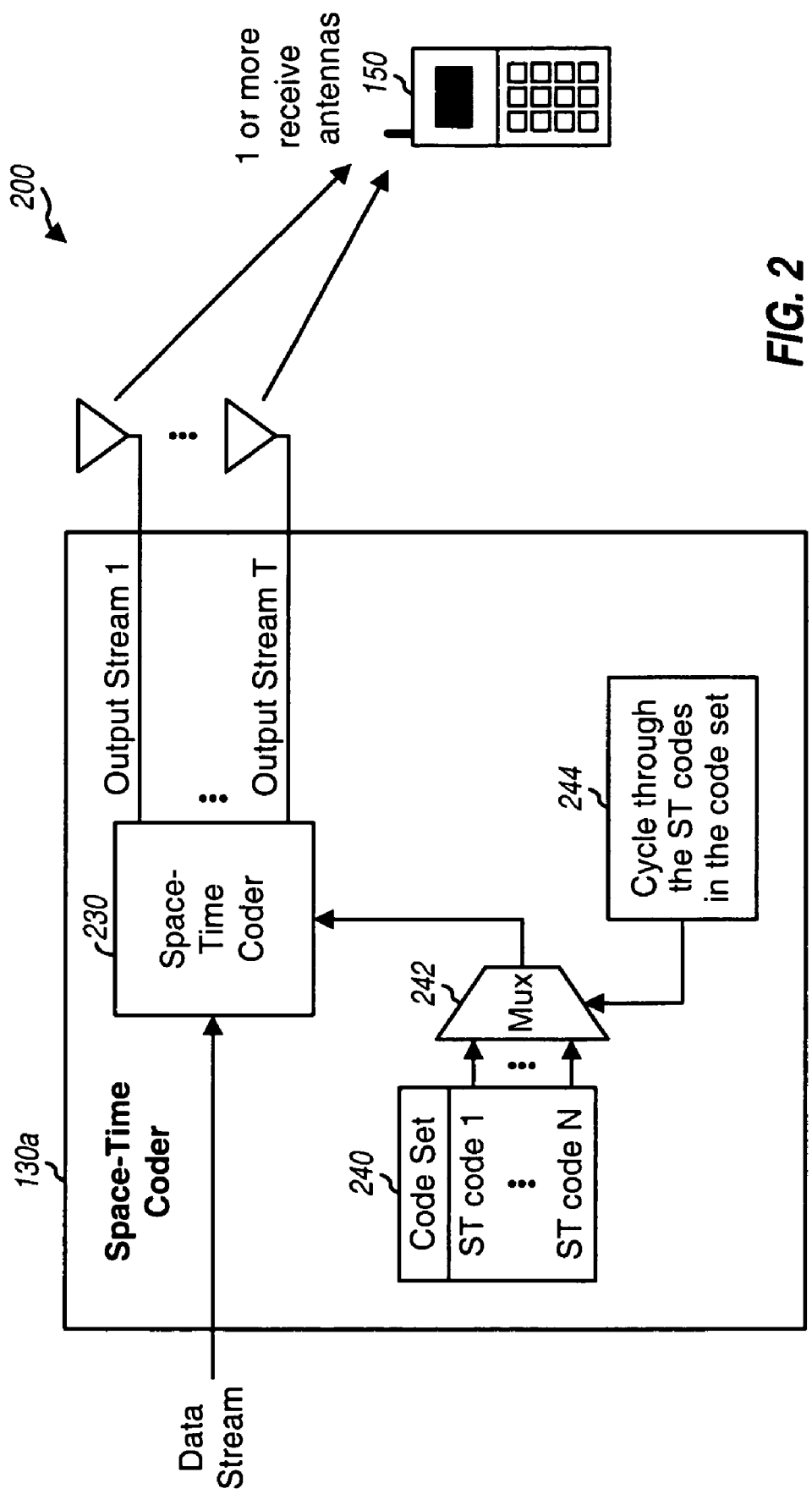
FIG. 2 shows space-time coding for one data stream with no feedback.

FIG. 2 shows a transmission scheme 200 with dynamic space-time coding for one data stream without any feedback. Within a space-time coder 130a, which is an embodiment of space-time coder 130 in FIG. 1, a memory 240 stores a code set containing multiple (N>1) space-time (ST) codes. A multiplexer (Mux) 242 receives the N space-time codes and provides one of the N space-time codes based on a selection signal from a control unit 244. Each selected space-time code is used for space-time coding for a predetermined time interval. A space-time coder 230 receives the data stream from TX data processor 120 and the selected space-time code from multiplexer 242, performs space-time coding on the data stream with the selected space-time code, and provides multiple (T) output streams. The T output streams are further conditioned and transmitted via the T transmit antennas to terminal 150, which may be single-antenna 150x or multi-antenna terminal 150y.

For the embodiment shown in FIG. 2, the space-time codes are selected by base station 110 without feedback from terminal 150. Control unit 244 may cycle through the N space-time codes in a cyclic manner, e.g., select ST code 1, then ST code 2, and so on, then ST code N, then back to ST code 1, and so on. Control unit 244 may also select the space-time codes in a pseudo-random manner, e.g., based on a pseudo-random number (PN) sequence. Control unit 244 may also select the space-time codes in other manners. In any case, the space-time codes are selected in a deterministic manner, i.e., a manner that is known by both base station 110 and terminal 150. Terminal 150 is thus aware of the space-time code used in each time interval.

The space-time codes in the code set may be defined in various manners. In an embodiment, the code set includes different space-time codes for all T transmit antennas. In another embodiment, the code set includes space-time codes for different numbers of transmit antennas. In yet another embodiment, the code set includes space-time codes with different antenna beams. An antenna beam is determined by the complex gains applied for the T transmit antennas. Different antenna beams may be formed by applying different sets of complex gains for the T transmit antennas. The space-time codes may be designed to provide better performance for expected channel conditions. For example, space-time codes that cope better with certain multipath profiles than STTD or OTD may be defined and used for space-time coding. Some exemplary space-time codes are described below.

Figure 3:
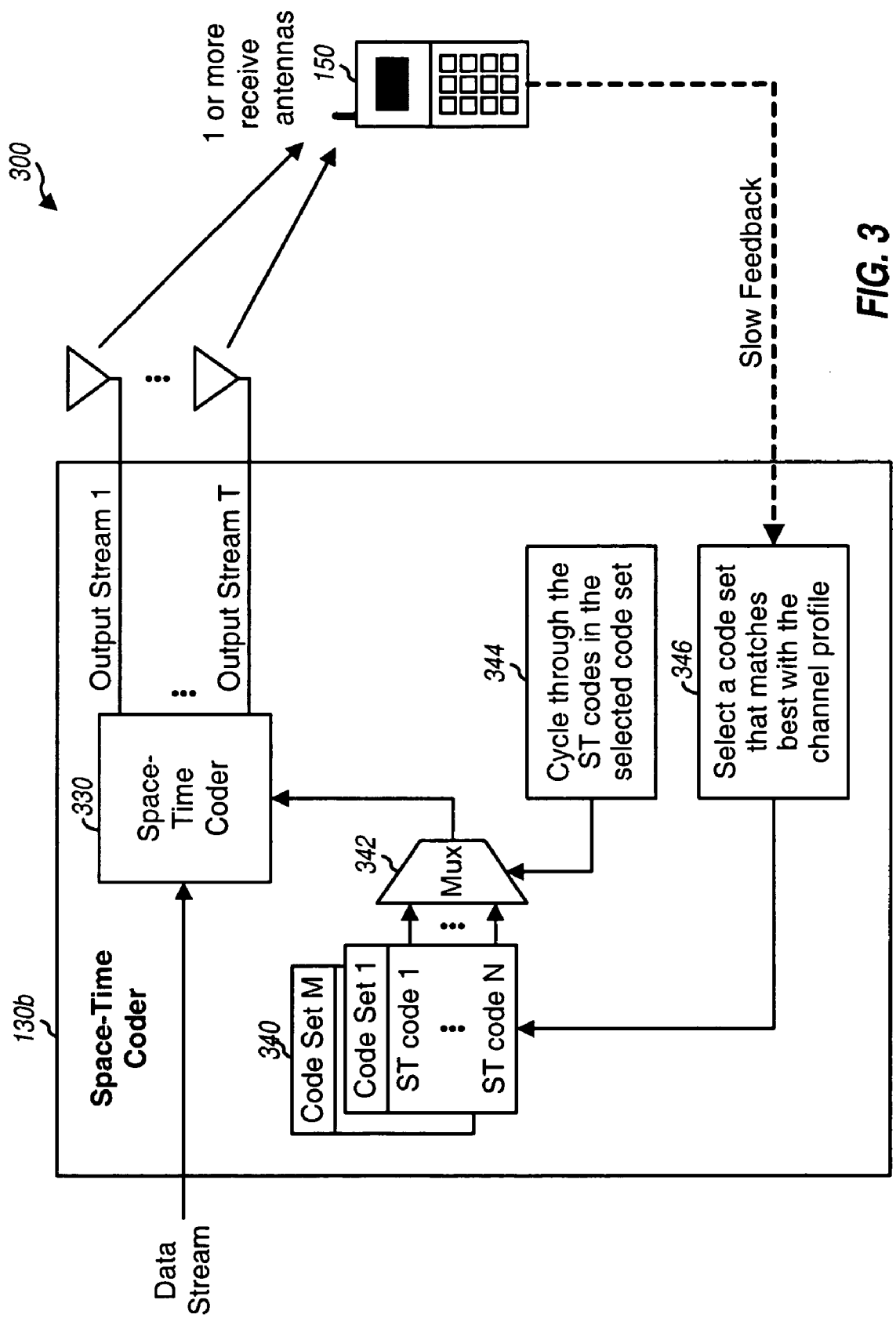
FIG. 3 shows space-time coding for one data stream with slow feedback.

FIG. 3 shows a transmission scheme 300 with dynamic space-time coding for one data stream with slow feedback from terminal 150. For the embodiment shown in FIG. 3, the slow feedback selects one code set from among multiple (M>1) code sets available for use.

Within a space-time coder 130b, which is another embodiment of space-time coder 130 in FIG. 1, a memory 340 stores the M code sets, with each code set containing one or multiple (N≧1) space-time codes. In an embodiment, a control unit 346 selects a code set that matches best with a channel profile for terminal 150. A channel profile is indicative of the long-term characteristics of a wireless channel, e.g., the long-term time-averaged energy of the multipaths in the wireless channel. A multiplexer 342 receives the N space-time codes for the selected code set and provides one of the N space-time codes based on a selection signal from a control unit 344. Control unit 344 may cycle through the N space-time codes in the selected code set in a cyclic/sequential manner, a pseudo-random manner, and so on. Each selected space-time code is used for space-time coding for a predetermined time interval. A space-time coder 330 receives the data stream and the selected space-time code, performs space-time coding on the data stream with the selected space-time code, and provides multiple (T) output streams for transmission via the T transmit antennas to terminal 150.

The M code sets may be designed to provide good performance for different channel profiles. The code sets may be defined in various manners.

In an embodiment, the code sets are defined for different numbers of transmit antennas. For example, one or more code sets may be defined for all T antennas available at base station 110, and one or more code sets may be defined for fewer than T antennas. In poor channel environments with low signal-to-noise ratios (SNRs), better performance may be achieved by transmitting from fewer antennas, which results in less cross-talk among the transmissions sent from the active antennas. For example, it may be desirable to perform space-time coding with few (e.g., one or two) antennas for SNRs below a particular SNR threshold. In good channel environments with high SNRs, better performance may be achieved by transmitting from more antennas to achieve greater spatial diversity. In any case, dynamic selection of the number of transmit antennas may be achieved by selecting an appropriate code set to use for space-time coding.

In another embodiment, the code sets are defined for different mobility environments. For example, one or more code sets may be defined for all stationary or low mobility environments, and one or more code sets may be defined for high mobility (e.g., high Doppler) environments. Different mobility environments may have different channel characteristics. The code sets may be defined to provide good performance for the different mobility environments.

In yet another embodiment, the code sets are defined to have different antenna beams. For example, one or more of the code sets may be defined such that the space-time codes effectively form antenna beams. The code set with antenna beam(s) that match well with the current channel profile may be selected for use. Within a selected code set, the time intervals in which the antenna beam(s) are preferable may be ascertained, and data may be sent to the terminal during these time intervals.

The selection of a code set that matches best with the current channel profile may be achieved in various manners. In an embodiment, terminal 150 ascertains its channel profile, selects a code set that matches best with the channel profile, and sends signaling to base station 110 to indicate the selected code set. In another embodiment, base station 110 receives feedback from terminal 150 and selects the best matching code set based on the received feedback. In yet another embodiment, base station 110 cycles through the M code sets for data transmission to terminal 150, receives feedback from terminal 150, and selects the best matching code set based on the received feedback. The feedback may be given in various forms such as, e.g., channel quality indicators (CQI), SNR estimates, data rates, acknowledgments (ACKs) for packets decoded correctly by terminal 150, negative acknowledgments (NAKs) for packets decoded in error, and so on. The CQIs, SNR estimates, and data rates are indicative of the received signal quality at terminal 150, which may be ascertained based on a pilot sent by base station 110. The best matching code set may also be selected in other manners.

In another embodiment of space-time coding with slow feedback, one set of space-time codes is used, and data is sent based on the slow feedback. For example, the N space-time codes may be cycled through as described above for FIG. 2. The dynamic space-time coding with continually changing space-time codes introduces artificial time variance in an effective channel comprised of the space-time coder and the wireless channel. The terminal may determine the time intervals during which one or more space-time codes match best with the current channel conditions and may report this information to the base station. The base station may then schedule the terminal for data transmission during these time intervals, which may improve scheduling gains on the downlink.

Figure 4:
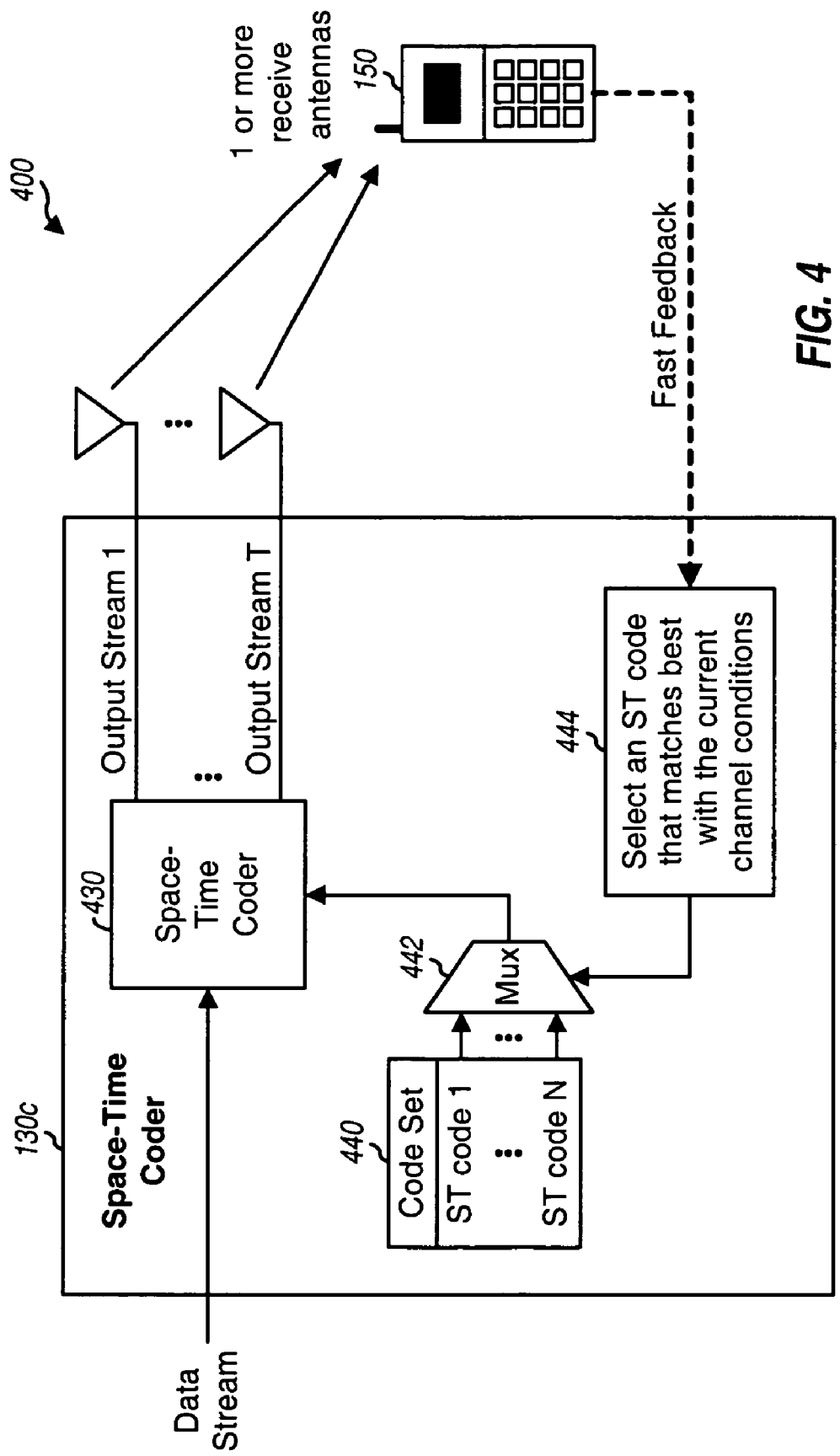
FIG. 4 shows space-time coding for one data stream with fast feedback.

FIG. 4 shows a transmission scheme 400 with dynamic space-time coding for one data stream with fast feedback from terminal 150, which is also called selective space-time (SST) coding. For the embodiment shown in FIG. 4, one code set is used for space-time coding, and the fast feedback selects a specific space-time code from among the multiple space-time codes in the code set.

Within a space-time coder 130c, which is yet another embodiment of space-time coder 130 in FIG. 1, a memory 440 stores the multiple (N>1) space-time codes for the code set, and a multiplexer 442 provides one or more of the N space-time codes based on a selection signal from a control unit 444. Control unit 444 receives feedback from terminal 150. This feedback may indicate which one or ones of the space-time codes in the code set best match the current channel conditions. Control unit 444 then directs multiplexer 442 to provide the selected space-time code(s).

In a fully adaptive transmission scheme, a terminal may define the space-time code based on the observed channel conditions. Transmission scheme 400 is different from the fully adaptive transmission scheme in that the terminal does not define the space-time code but rather selects the best matching space-time code(s) from among the predefined space-time codes. Hence, the terminal does not need to define the space-time code(s), which simplifies operation, and does not need to send the defined space-time code to the base station, which reduces signaling. Instead, the terminal may send a small amount of signaling indicating the selected space-time code(s). This signaling may be as few as $\lceil \log_2 N \rceil$ bits for each selected space-time code, where $\lceil x \rceil$ denotes a ceiling operation that provides an integer value equal to or larger than x.

Transmission scheme 400 allows for faster adaptation to the current channel conditions using faster but limited feedback. The feedback requirements may be relatively trivial because only a small amount of signaling is sent back.

A transmission scheme may perform dynamic space-time coding based on a combination of fast and slow feedback. The slow feedback may select one code set among multiple available code sets based on the channel profile. The fast feedback may select one or more space-time codes from among the multiple space-time codes in the selected code set. Operation is simplified since the terminal only needs to evaluate N different space-time codes (instead of M·N space-time codes) for each time interval. Signaling is also reduced since the terminal sends back $\lceil \log_2 N \rceil$ bits (instead of $\lceil \log_2 (M \cdot N) \rceil$ bits) for a selected space-time code.

Transmission schemes 200, 300 and 400 transmit a single data stream from multiple (T) antennas using space-time coding to achieve space and time diversity. Multiple data streams may also be sent simultaneously to multi-antenna terminal 150y or to multiple terminals. A MIMO transmission may be sent for good channel environments with high SNRs.

Figure 5:
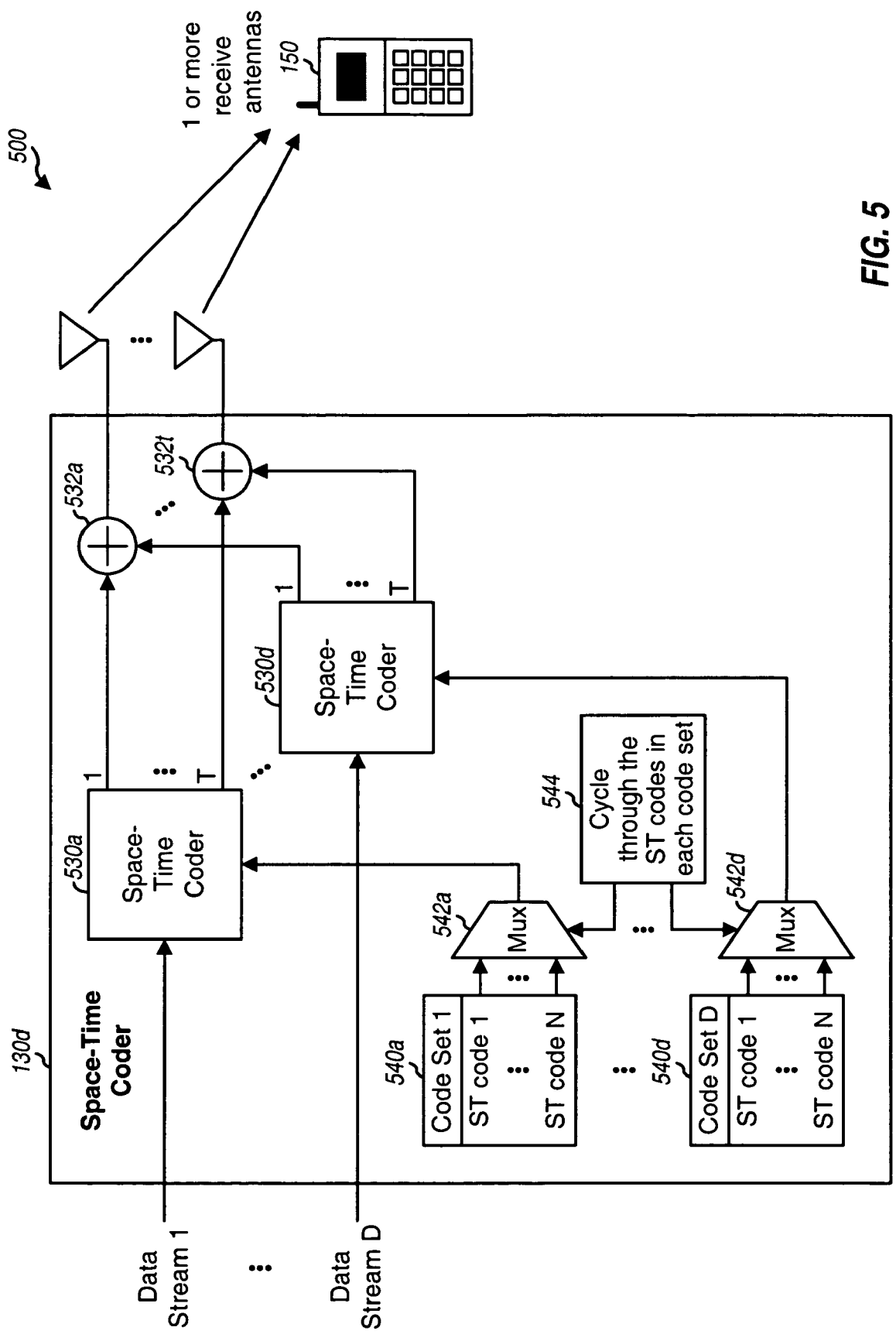
FIG. 5 shows space-time coding for multiple data streams with no feedback.

FIG. 5 shows a transmission scheme 500 with dynamic space-time coding for multiple (D>1) data streams without any feedback. Within a space-time coder 130d, which is yet another embodiment of space-time coder 130 in FIG. 1, D memories 540a through 540d store D code sets for the D data streams. Each code set contains one or multiple (N≧1) space-time codes. D multiplexers 542a through 542d couple to D memories 540a through 540d, respectively. Each multiplexer 542 receives the N space-time codes from an associated memory 540 and provides one of the N space-time codes based on a selection signal from a control unit 544. Control unit 544 may cycle through the N space-time codes in each code set in a cyclic/sequential manner, a pseudo-random manner, and so on.

D space-time coders 530a through 530d receive data streams 1 through D, respectively, from TX data processor 120 in FIG. 1. These data streams may be sent without channelization or may be channelized with different channelization codes (e.g., Walsh or OVSF codes) to reduce interference among the data streams or may be channelized by reusing the same channelization codes. Space-time coders 530a through 530d also receive the selected space-time codes from multiplexers 542a through 542d, respectively. Each space-time coder 530 performs space-time coding on its data stream with its selected space-time code and provides multiple (T) coded streams. Adders 532a through 532t receive the T coded streams from all D space-time coders 530a through 530d. Each adder 532 adds the D coded streams from D space-time coders 530a through 530d for an associated antenna and provides an output stream for that antenna.

The D code sets may be defined in various manners. Each code set may be defined using any of the embodiments described above for transmission scheme 200 in FIG. 2. In an embodiment, a single set of N space-time codes is defined, and each of the D code sets is formed by a different permutation of these N space-time codes. In another embodiment, the D code sets are defined for different partitions of the available transmit antennas, which may reduce interference between the data streams. For example, each odd-numbered code set may be defined for odd-numbered transmit antennas, and each even-numbered code set may be defined for even-numbered transmit antennas. In yet another embodiment, the D code sets are defined for different combinations of transmit antennas. For example, code set 1 may be defined for transmit antennas 2, 3 and 4 among four total antennas, code set 2 may be defined for transmit antennas 1, 3 and 4, code set 3 may be defined for transmit antennas 1, 2 and 4, and code set 4 may be defined for transmit antennas 1, 2 and 3. In general, the D code sets may include the same or different numbers of space-time codes and the same or different space-time codes.

Figure 6:
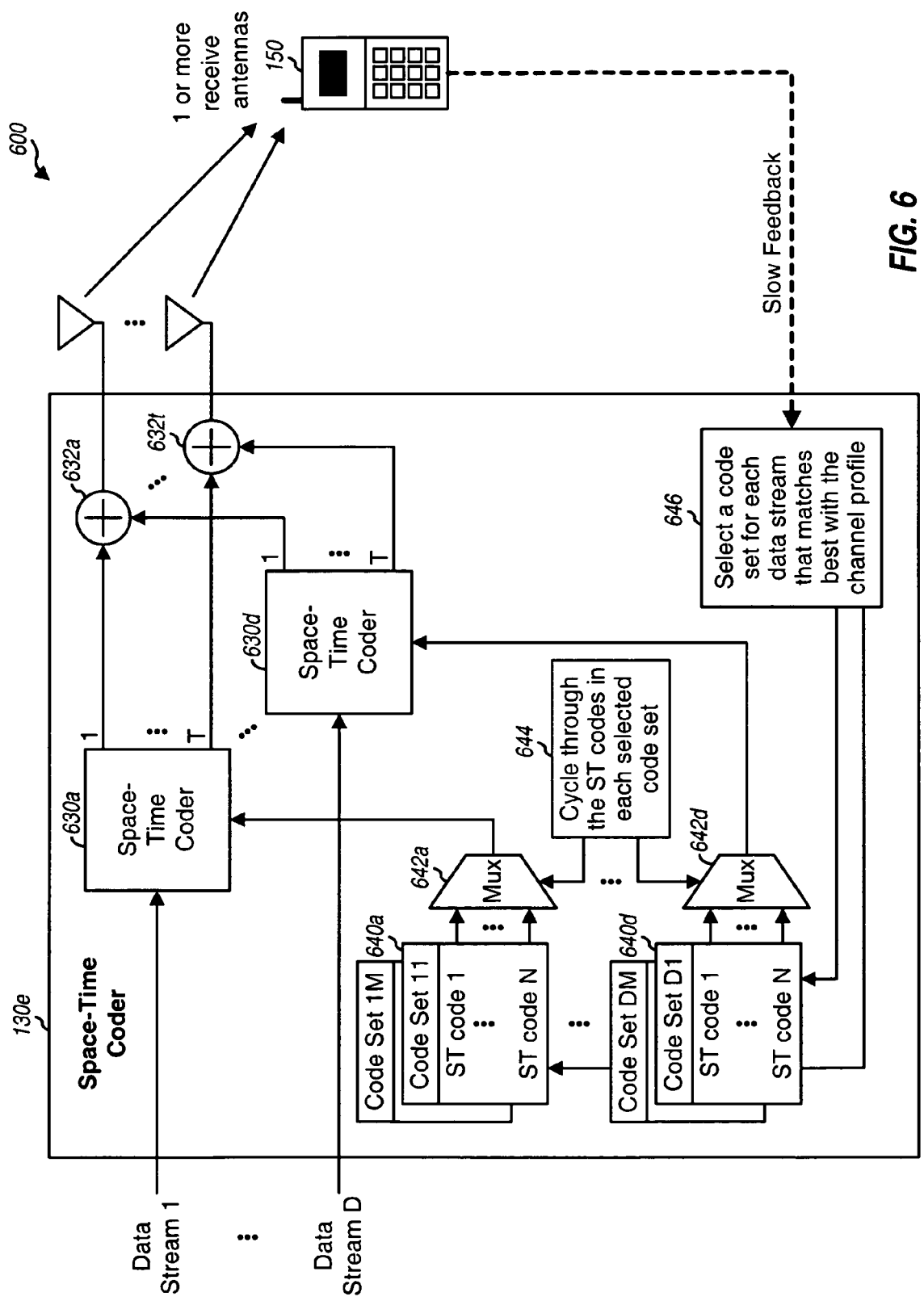
FIG. 6 shows space-time coding for multiple data streams with slow feedback.

FIG. 6 shows a transmission scheme 600 with dynamic space-time coding for multiple (D>1) data streams with slow feedback. For the embodiment shown in FIG. 6, the slow feedback for each data stream selects one code set from among multiple (M>1) code sets available for that data stream.

Within a space-time coder 130e, which is yet another embodiment of space-time coder 130 in FIG. 1, D memories 640a through 640d store the code sets for the D data streams. Each memory 640 stores multiple (M>1) code sets for one data stream, with each code set containing one or multiple (N≧1) space-time codes. A control unit 646 receives feedback from terminal 150 and selects a code set for each data stream from among the code sets available for that data stream. For example, control unit 646 may select a code set for each data stream that best matches the channel profile reported by terminal 150.

D multiplexers 642a through 642d couple to D memories 640a through 640d, respectively. Each multiplexer 642 receives the N space-time codes for the selected code set from an associated memory 640 and provides one of the N space-time codes based on a selection signal from a control unit 644. Control unit 644 may cycle through the N space-time codes in the selected code set in a cyclic/sequential manner, a pseudo-random manner, and so on. D space-time coders 630a through 630d receive data streams 1 through D, respectively, as well as the selected space-time codes from multiplexers 642a through 642d, respectively. Space-time coders 630a through 630d and adders 632a through 632t operate as described above for space-time coders 530a through 530d and adders 532a through 532 in FIG. 5.

The M code sets for each data stream may be designed to provide good performance for different channel profiles, as described above for transmission scheme 300 in FIG. 3. The code set for each data stream may also be selected using any of the embodiments described above for transmission scheme 300. The code sets for the D data streams may be independently selected, e.g., based on the channel conditions and/or performance for these data streams. The code sets for the D data streams may also be jointly selected, e.g., based on a single feedback from the terminal for all D data streams.

Figure 7:
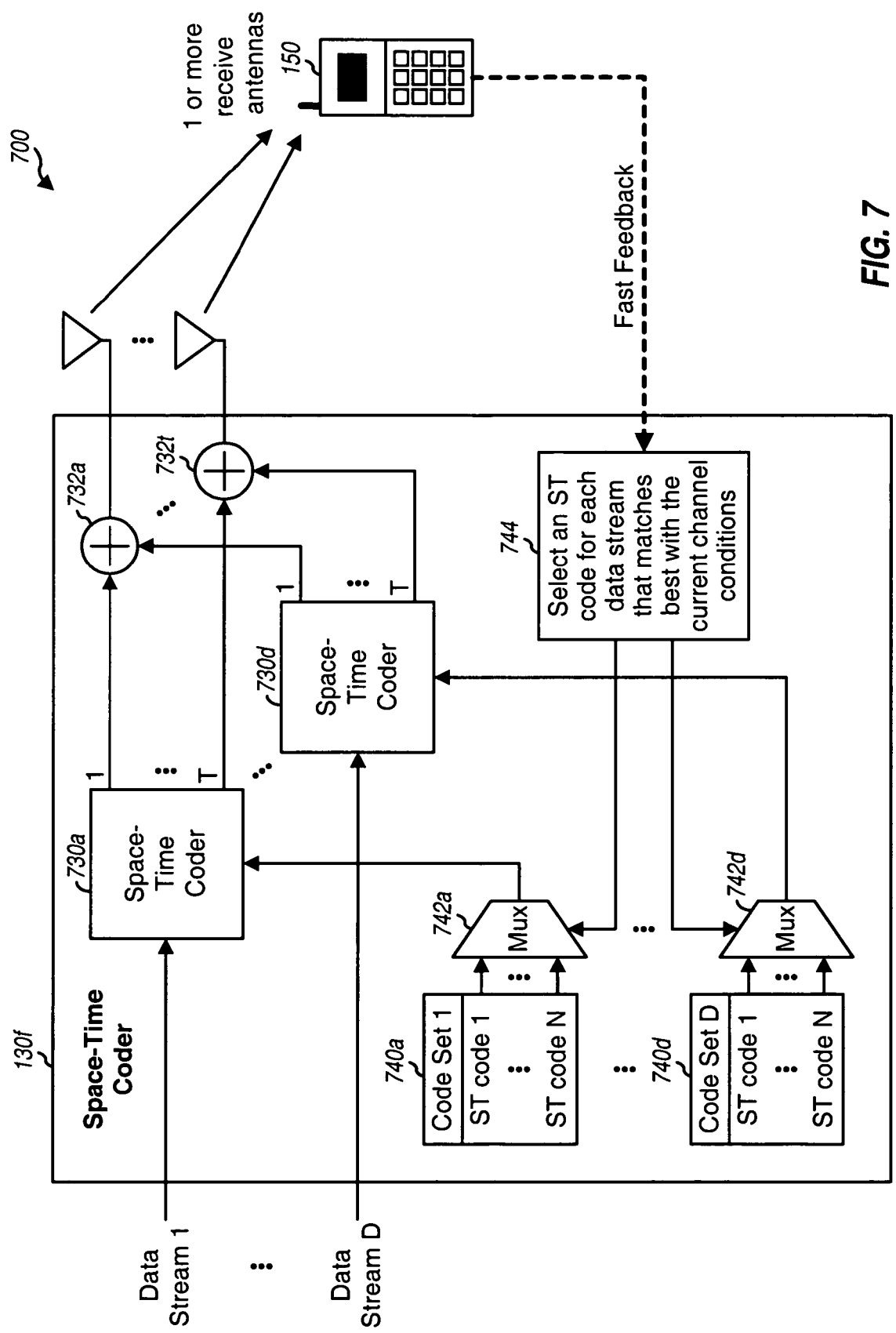
FIG. 7 shows space-time coding for multiple data streams with fast feedback.

FIG. 7 shows a transmission scheme 700 with dynamic space-time coding for multiple (D>1) data streams with fast feedback. For the embodiment shown in FIG. 7, one code set is used for space-time coding for each data stream, and the fast feedback for each data stream selects a specific space-time code from among the multiple space-time codes in the code set for that data stream.

Within a space-time coder 130f, which is yet another embodiment of space-time coder 130 in FIG. 1, memories 740a through 740d store the N sets of space-time, codes for the D data streams. Multiplexers 742a through 742d couple to memories 740a through 740d, respectively. Each multiplexer 742 provides one or more of the N space-time codes for the associated data stream based on a selection signal for that data stream. A control unit 744 receives feedback from terminal 150. This feedback may indicate, for each data stream, which one(s) of the space-time codes in the code set for that data stream best match the current channel conditions. Control unit 744 then directs each multiplexer 742 to provide the selected space-time code(s) for the associated data stream.

Transmission scheme 700 supports multiple data streams and allows for faster adaptation to the current channel conditions using faster but limited feedback. Transmission scheme 700 has the advantages described above for transmission scheme 400 in FIG. 4.

The space-time coding for each data stream provides an averaging effect for that data stream. Furthermore, the space-time coding for multiple parallel data streams (which is the goal in high SNR MIMO cases) results in these data streams achieving similar SNRs due to the averaging effect. The similar SNRs may be exploited to reduce the feedback rate from the terminal for data rate control of the multiple data streams.

Figure 8A:
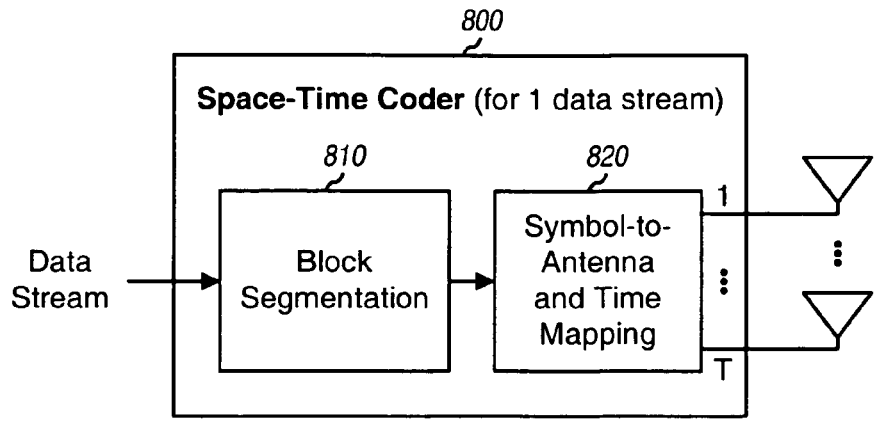
FIG. 8A shows a space-time coder for one data stream.

FIG. 8A shows an embodiment of a space-time coder 800 for one data stream. Space-time coder 800 may be used for space-time coders 230, 330, 430, 530, 630 and 730 in FIGS. 2 through 7. Within space-time coder 800, a block segmentation unit 810 receives and partitions the data stream into blocks. Each block may contain a predetermined number of data symbols, e.g., P data symbols, where P≧1. Depending on the processing performed by TX data processor 120, a data symbol may be a modulation symbol generated based on a modulation scheme, a data chip generated after channelization (i.e., spreading) and/or scrambling, or some other unit of data.

A mapping unit 820 maps the data symbols in each block to different symbol periods and antennas based on a mapping scheme and provides code symbols for the T transmit antennas. Mapping unit 820 may map the data symbols directly or may perform arithmetic and/or other operations on the data symbols prior to mapping. Mapping unit 820 may generate the same number of code symbols (e.g., Q data symbols, where Q≧1) for each antenna, in which case the code rate is P/Q. Code rates of one, more than one, and less than one may be flexibly obtained with different mapping schemes. In contrast, STIT and OTD have a fixed code rate of one. Alternatively, mapping unit 820 may generate different numbers of code symbols for different antennas. For example, mapping unit 820 may receive a block of 3 data symbols and generate 8 code symbols for antenna 1, 5 code symbols for antenna 2, 8 code symbols for antenna 3, and so on. In any case, mapping unit 820 provides T sequences of code symbols (or T codewords) for the T antennas for each block of data symbols.

Various mapping schemes may be used to map data symbols to symbol periods and antennas. These mapping schemes may use linear mapping, non-linear mapping, or both. An exemplary mapping scheme is described below.

Figure 8B:
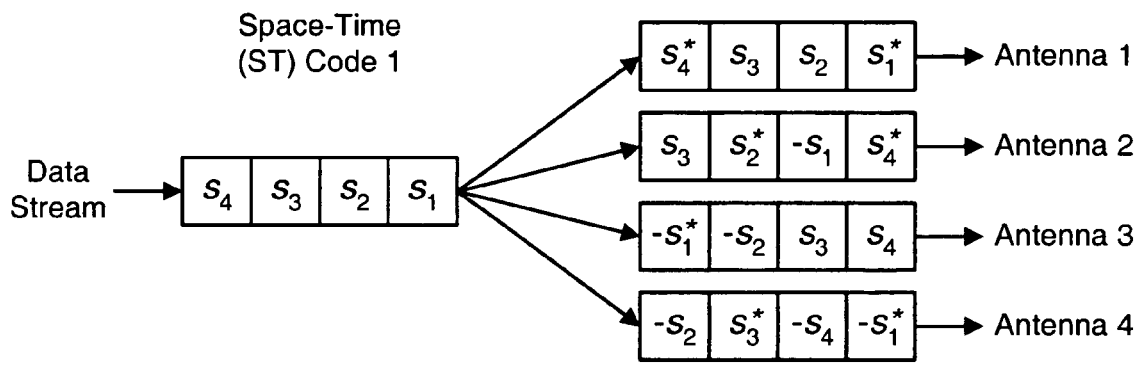
FIG. 8B shows two exemplary space-time codes.
Figure 8B:
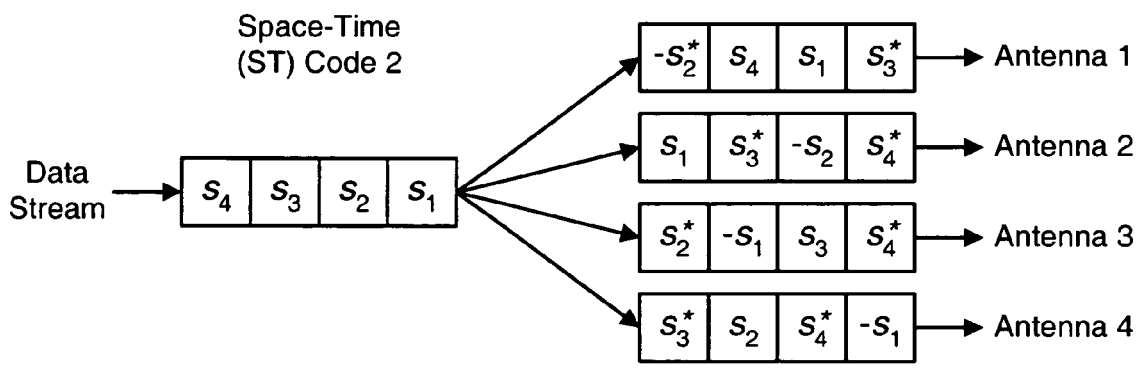

FIG. 8B shows an exemplary mapping scheme for two space-time codes with four transmit antennas. For this example, block segmentation unit 810 partitions the data stream into blocks of four data symbols. The data symbols in each block are mapped to each transmit antenna based on a specific mapping. Each space-time code uses a different set of mappings for the four transmit antennas. For the example shown in FIG. 8B, the mappings for the four transmit antennas for each space-time code are such that (1) each data symbol block is sent in a 4-symbol interval, (2) each data symbol in the block is sent from all four transmit antennas during the 4-symbol interval, and (3) the four data symbols are sent from each transmit antenna in the 4-symbol interval. All four data symbols may be sent from the four transmit antennas in a given symbol period. A given data symbol may also be sent from multiple transmit antennas in one symbol period. The different mappings for the different space-time codes may be selected to achieve good performance, e.g., for different operating scenarios.

For exemplary space-time codes shown in FIG. 8B, a receiver may obtain four received symbols $\{r_1, r_2, r_3$ and $r_4\}$ from each receive antenna in a 4-symbol interval for each data symbol block sent by the transmitter. A single-antenna receiver may recover each transmitted data symbol based on a different linear combination of the four received symbols. The single-antenna receiver may recover the four transmitted data symbols $\{s_1, s_2, s_3$ and $s_4\}$ based on four different equations of the received symbols. A multi-antenna receiver may recover each transmitted data symbol based on a different linear combination of the received symbols for all receive antennas. The equations/linear combinations used by each receiver to recover the transmitted data symbols are determined by the mappings used by the transmitter to send the data symbols. The receiver may derive estimates of the channel gains between the transmit and receive antennas and may use the channel gain estimates to scale the received symbols prior to combining. The receiver may also recover the transmitted data symbols using non-linear techniques. For example, the receiver may perform maximum likelihood detection and evaluate all possible combinations of transmitted data symbols. The receiver may construct hypothetical received signals for different combinations of transmitted data symbols based on the ST code(s) used by the transmitter, compare the received signals with the hypothetical received signals, and determine the combination of data symbols that is most likely to have been transmitted based on the comparison results.

Figure 9:
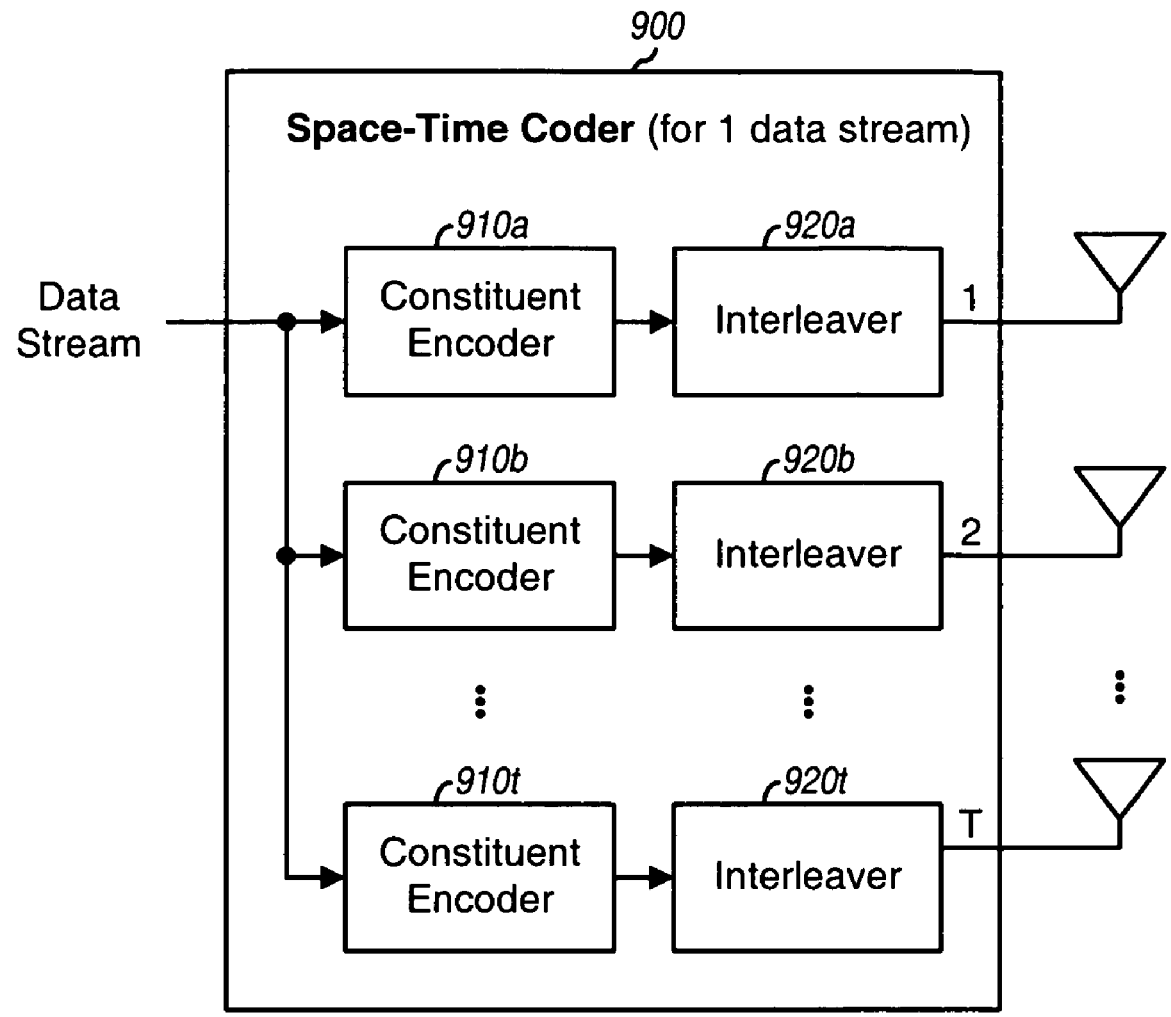
FIG. 9 shows another space-time coder for one data stream.

FIG. 9 shows an embodiment of a space-time coder 900 for one data stream. Space-time coder 900 may also be used for space-time coders 230, 330, 430, 530, 630 and 730 in FIGS. 2 through 7. Space-time coder 900 includes T constituent encoders 910a through 910t and T interleavers 920a through 920t for the T transmit antennas. Within space-time coder 900, the data stream is provided to all T constituent encoders 910a through 910t. Each constituent encoder 910 encodes its input symbols based on a polynomial generator selected for that constituent encoder and provides code symbols to an associated interleaver 920. The T generator polynomials for the T constituent encoders 910a through 910t may be selected to provide good performance. Each interleaver 920 interleaves (or reorders) its code symbols based on a particular interleaving scheme and provides interleaved symbols for an associated transmit antenna.

The space-time coding in FIG. 9 resembles rate 1/T Turbo coding. In another embodiment, interleavers 910b through 910*t* are omitted, and the data stream is provided to all T constituent encoders 920*a* through 920*t*. The space-time coding for this embodiment then resembles rate 1/T convolutional coding. Different space-time codes may be obtained with different generator polynomials and/or different assignments of generator polynomials to antennas.

The space-time codes may also be defined in other manners, and this is within the scope of the invention.

For the embodiments described above, the space-time codes are predefined and static and are known to both the base station and terminal. In other embodiments, the space-time codes may be defined, e.g., by the receiving terminal based on the channel profile. Good space-time codes that can provide good performance may thus be defined over a rather long period of time and sent to the base station. This dynamic definition of the space-time codes may be beneficial in situations where the space-time codes do not change for relatively long periods of time, e.g., when the terminal is stationary at the same location for a long period of time.

The different effective channels resulting from the use of different space-time codes may be exploited in the scheduling of terminals for data transmission. For example, each terminal that desires data transmission may estimate the received signal quality in each time interval. The received signal quality may vary from interval to interval for each terminal due to the use of different space-time codes. Each terminal may send (1) a CQI to the base station in each time interval, (2) an indication as to which time intervals or space-time code(s) result in the best received signal quality, or (3) some other type of feedback. For each time interval, the base station may select one or more terminals for data transmission based on the feedback received from all terminals. For example, in each time interval, the base station may transmit data to the terminal with the best received signal quality for that time interval, subject to any quality of service (QoS) requirements. In this manner, the spatial diversity achieved through dynamic space-time coding is exploited to schedule terminals for data transmission.

Figure 10:
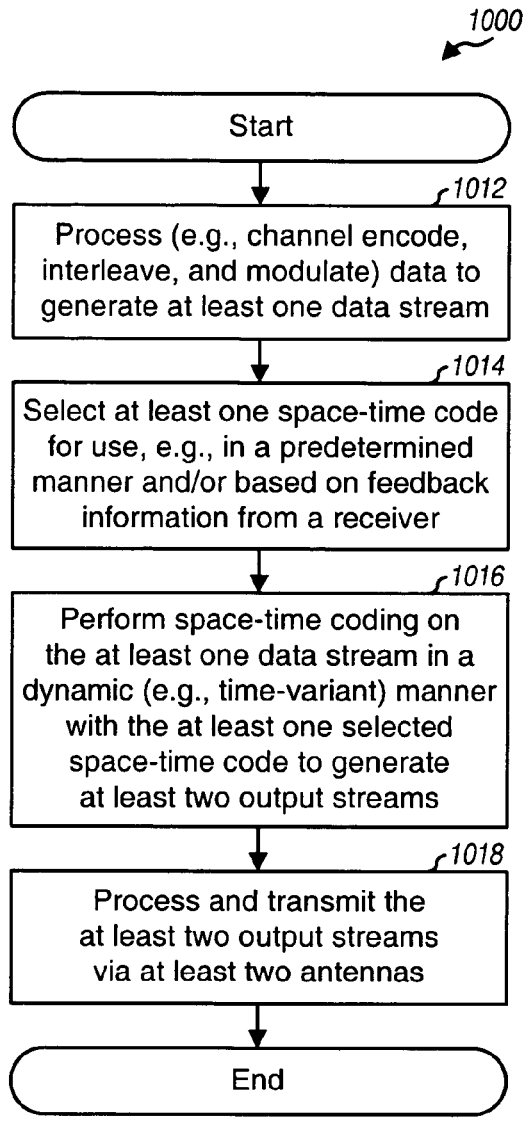
FIG. 10 shows a process for transmitting data with space-time coding.

FIG. 10 shows a process 1000 performed by a transmitter (e.g., a base station) to transmit data with dynamic space-time coding. Initially, data is processed (e.g., channel encoded, interleaved, and symbol mapped) to generate at least one data stream (block 1012). At least one space-time (ST) code is selected for use (block 1014). The ST code selection may be performed in various manners such as (1) in a predetermined manner without feedback, e.g., by cycling through the space-time codes in a code set, (2) based on feedback information from a receiver, e.g., which may indicate a code set or one or more specific space-time codes, or (3) a combination of both, e.g., by cycling through the space-time codes in a code set indicated by the feedback information. Each, data stream may be independently channel encoded and symbol mapped based on a coding and modulation scheme selected for that data stream. Space-time coding is then performed on the at least one data stream in a dynamic (e.g., time-variant) manner with the at least one selected space-time code to generate at least two output streams (block 1016). The space-time coding may be performed with at least one set of space-time codes, e.g., one or multiple sets of space-time codes for each data stream. The space-time coding may also be performed using no feedback (e.g., by cycling through the space-time codes for each data stream), using slow feedback (e.g., to select a code set for each data stream from among multiple code sets available for that data stream), or using fast feedback (e.g., to select a space-time code for each data stream from among multiple space-time codes available for that data stream). The at least two output streams are then processed and transmitted via at least two antennas (block 1018).

Figure 11:
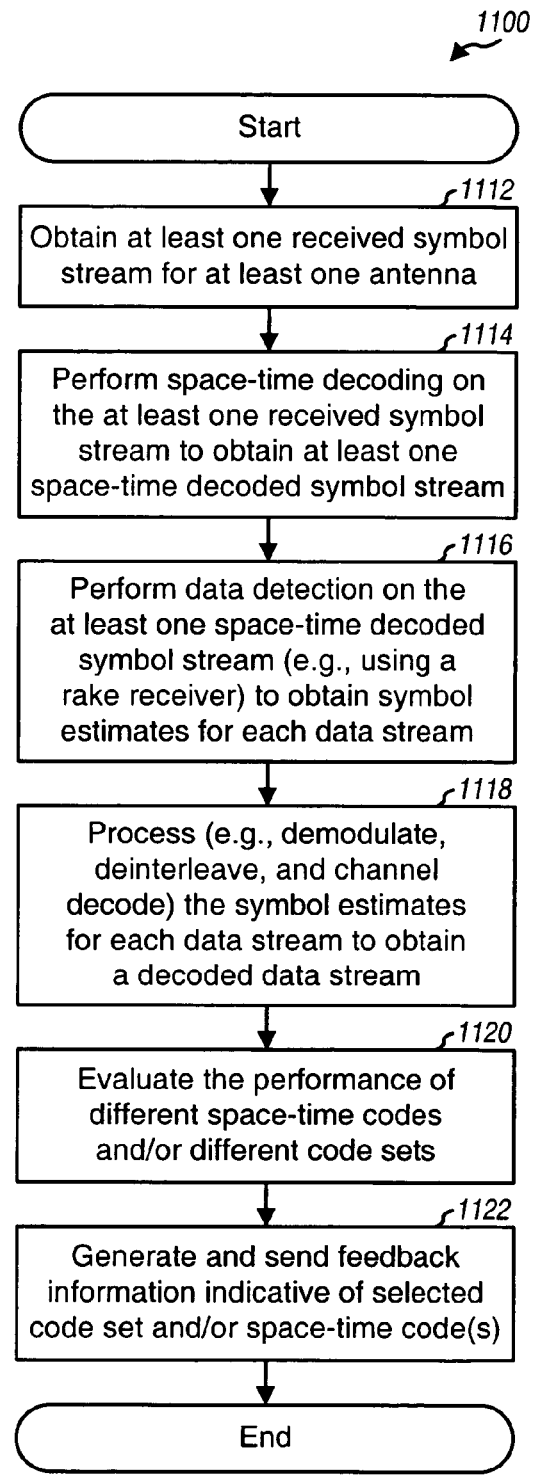
FIG. 11 shows a process for receiving data sent with space-time coding.

FIG. 11 shows a process 1100 performed by a receiver (e.g., a terminal) to receive a transmission sent with dynamic space-time coding. At least one received symbol stream is obtained for at least one antenna (block 1112). Space-time decoding is then performed on the at least one received symbol stream to obtain at least one space-time decoded symbol stream (block 1114).

The space-time decoding is dependent on, and complementary to, the space-time coding performed by the transmitter. The space-time decoding may be performed in various manners. In an embodiment, the space-time decoding is performed by linearly combining the received symbols based on the space-time codes used by the transmitter. In another embodiment, the space-time decoding is performed by evaluating different hypotheses of the transmitted data symbols, e.g., based on a maximum likelihood decoder that minimizes an error metric. In yet another embodiment, space-time decoding is performed by successively or iteratively identifying received symbols of high reliability and limiting the number of hypotheses to evaluate.

In any case, the space-time decoding provides at least one space-time decoded symbol stream, which is further processed (e.g., despread and detected) to obtain data symbol estimates (block 1116). The data symbol estimates are estimates of the data symbols sent by the transmitter and are further processed (e.g., demodulated, deinterleaved, and channel decoded) to obtain at least one decoded data stream (block 1118). The space-time decoding and channel decoding may also be performed jointly, e.g., by performing maximum likelihood decoding for the channel encoding, interleaving, symbol mapping, and space-time coding.

The performance of different space-time codes and/or different code sets may be evaluated (block 1120). The code set and/or space-time code(s) that provide good performance may be selected. Feedback information indicative of the selected code set and/or space-time code(s) may be generated and sent back to the transmitter (block 1122).

The dynamic space-time coding described herein have various desirable characteristics including:
Simplify operation with no feedback or little feedback from the terminal;
Allow for use of any number of antennas and for more than two transmit antennas, which is not supported by STID and OTD;
Support different code rates per transmit antenna, including code rates greater or less than one;
Avoid the need for the receiver to derive the space-time codes, which is potentially not trivial;
Avoid a bad "channel state to space-time code" scenario for an extended period of time, even if the terminal is stationary or moving slowly, due to the use of continually changing space-time codes.
Introduce artificial time variance in the effective channels for the terminals, which may be used in scheduling the terminals for data transmission;
Provide an averaging effect on link quality due to the use of different space-time codes, which may result in additional diversity for a data transmission; and
Result in similar SNRs being achieved for multiple data streams being sent simultaneously due to the averaging effect, which potentially reduces the feedback rate for data rate control of the multiple data streams.

The bad "channel state to space-time code" scenario occurs when the space-time code does not match the channel state and results in poor performance.

The techniques described herein for transmitting data with dynamic space-time coding may be used for various communication systems such as cellular systems, wide area systems, local area systems, and so on. A cellular system may utilize Code Division Multiple Access (CDMA), Time Division Multiple Access (TDMA), Frequency Division Multiple Access (FDMA), Orthogonal Frequency Division Multiple Access (OFDMA), or some other multiple-access scheme. A CDMA system may implement one or more CDMA radio technologies such as Wideband-CDMA (W-CDMA), cdma2000, and so on. cdma2000 covers IS-2000, IS-856, and IS-95 standards. A TDMA system may implement one or more TDMA radio technologies such as Global System for Mobile Communications (GSM), Digital Advanced Mobile Phone System (D-AMPS), and so on. These various radio technologies and standards are known in the art. W-CDMA and GSM are described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available, e.g., through ETSI, TIA and other standardizations bodies.

The techniques described herein may be implemented by various means. For example, these techniques may be implemented in hardware, software, firmware, or a combination thereof. For a hardware implementation, the space-time coding at a transmitter may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The space-time decoding at a receiver may also be implemented within one or more ASICs, DSPs, processors, and so on.

For a software/firmware implementation, the techniques may be implemented with modules (e.g., procedures, functions, and so on) that perform the functions described herein. The software/firmware codes may be stored in a memory (e.g., memory 142, 182x or 182y in FIG. 1) and executed by a processor (e.g., processor 140, 180x or 180y). The memory may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
at least one processor operative to generate at least one data stream and to perform a space-time coding on the at least one data stream in a dynamic manner to generate at least two output streams for transmission from at least two antennas to a terminal, and
a memory operatively coupled to the at least one processor;
wherein performing the space-time coding comprises selecting a set of space-time codes from among multiple sets of space-time codes based on a channel profile from the terminal, wherein the space-time coding further comprises selecting a space-time code after selecting the set by either cycling through multiple space-time codes in the selected set of space-time codes in a cyclic manner or selecting one of the multiple space-time codes from the selected set in a pseudo-random manner;
wherein each set of space-time codes includes multiple space-time codes;
wherein each space-time code defines a mapping of symbols to transmit antennas and symbol periods; and
wherein the channel profile is indicative of long-term characteristics of a wireless channel from the apparatus to the terminal.

2. The apparatus of claim 1, wherein the at least one processor is operative to perform space-time coding on the at least one data stream in the dynamic manner by using different space-time codes in different time intervals.

3. The apparatus of claim 1, wherein the at least one processor is operative to perform space-time coding on the at least one data stream based on at least one set of space-time codes.

4. The apparatus of claim 1, wherein the at least one processor is operative to select different space-time codes for different time intervals and to perform space-time coding for each time interval based on at least one space-time code selected for the time interval.

5. The apparatus of claim 1, wherein the at least one processor is operative to receive feedback from a receiver and to perform space-time coding based on the received feedback.

6. The apparatus of claim 1, wherein the at least one processor is operative to receive a feedback indicative of time intervals more suitable for data transmission and to transmit the at least one data stream during the time intervals indicated by the received feedback.

7. The apparatus of claim 1, wherein the at least one processor is operative to select at least one set of space-time codes from among multiple sets of space-time codes available for space-time coding, and to perform space-time coding on the at least one data stream based on the at least one set of space-time codes.

8. The apparatus of claim 1, wherein the at least one processor is operative to select a set of space-time codes for each data stream from among multiple sets of space-time codes available for the data stream, and to perform space-time coding for each data stream based on the set of space-time codes selected for the data stream.

9. The apparatus of claim 3, wherein each space-time code corresponds to a different mapping of data symbols to antennas and symbol periods.

10. The apparatus of claim 3, wherein each space-time code corresponds to a different set of generator polynomials used for encoding the at least one data stream for the at least two antennas.

11. The apparatus of claim 7, wherein the multiple sets of space-time codes are designed for different numbers of antennas or for different sets of antennas.

12. The apparatus of claim 7, wherein the multiple sets of space-time codes are designed for different channel profiles.

13. The apparatus of claim 7, wherein the multiple sets of space-time codes are associated with different antenna beams.

14. The apparatus of claim 1, wherein the at least one processor is operative
to receive feedback information from a receiver, and
to selectively perform space-time coding based on the feedback information.

15. The apparatus of claim 1, wherein the at least one processor is operative to perform channel encoding for the at least one data stream.

16. The apparatus of claim 1, wherein cycling through multiple space-time codes comprises selecting a first code in the selected set of space-time codes, selecting a second code in the selected set of space-time codes, and repeating this process sequentially until a final code in the selected set of codes is selected and then, after the final code in the selected set of space-time codes has been selected, selecting the first code in the selected set of space-time codes.

17. A method comprising:
generating at least one data stream; and
performing a space-time coding on the at least one data stream in a dynamic manner to generate at least two output streams for transmission from at least two antennas to a terminal,
wherein performing the space-time coding comprises selecting a set of space-time codes from among multiple sets of space-time codes based on a channel profile from the terminal, wherein the space-time coding further comprises selecting a space-time code after selecting the set by either cycling through multiple space-time codes in the selected set of space-time codes in a cyclic manner or selecting one of the multiple space-time codes from the selected set in a pseudo-random manner;
wherein each set of space-time codes includes multiple space-time codes;
wherein each space-time code defines a mapping of symbols to transmit antennas and symbol periods; and
wherein the channel profile is indicative of long-term characteristics of a wireless channel from the apparatus to the terminal.

18. The method of claim 17, wherein the performing space-time coding comprises
performing space-time coding on each data stream based on a respective set of space-time codes.

19. The method of claim 17, wherein the performing space-time coding comprises
selecting a set of space-time codes for each data stream from among multiple sets of space-time codes available for the data stream, and
performing space-time coding for each data stream based on the set of space-time codes selected for the data stream.

20. The method of claim 19, wherein the selecting the set of space-time codes for each data stream comprises
receiving feedback from a receiver.

21. An apparatus comprising:
means for generating at least one data stream; and
means for performing a space-time coding on the at least one data stream in a dynamic manner to generate at least two output streams for transmission from at least two antennas to a terminal;
wherein performing the space-time coding comprises selecting a set of space-time codes from among multiple sets of space-time codes based on a channel profile from the terminal, wherein the space-time coding further comprises selecting a space-time code after selecting the set by either cycling through multiple space-time codes in the selected set of space-time codes in a cyclic manner or selecting one of the multiple space-time codes from the selected set in a pseudo-random manner;
wherein each set of space-time codes includes multiple space-time codes;
wherein each space-time code defines a mapping of symbols to transmit antennas and symbol periods; and
wherein the channel profile is indicative of long-term characteristics of a wireless channel from the apparatus to the terminal.

22. The apparatus of claim 21, wherein the means for performing space-time coding comprises
means for performing space-time coding on each data stream based on a respective set of space-time codes.

23. The apparatus of claim 21, wherein the means for performing space-time coding comprises
means for selecting a set of space-time codes for each data stream from among multiple sets of space-time codes available for the data stream, and
means for performing space-time coding for each data stream based on the set of space-time codes selected for the data stream.

24. The apparatus of claim 23, wherein the means for selecting the set of space-time codes for each data stream comprises
means for receiving feedback from a receiver.

25. An apparatus comprising:
at least one processor operative to obtain at least one received symbol stream from at least one receive antenna, to perform a space-time decoding on the at least one received symbol stream to obtain at least one space-time decoded symbol stream, and to generate a channel feedback for use when selecting a space-time code set before selecting a space-time code within the selected set, wherein the at least one space-time decoded symbol stream is an estimate of at least one data stream transmitted with a dynamic space-time coding, and wherein the space-time decoding is complementary to the dynamic space-time coding; and
a memory operatively coupled to the at least one processor;
wherein performing the space-time decoding comprises determining a space-time code used for each data stream in each time interval from among a set of space-time codes available for the data stream,
wherein a space-time code defines a mapping of symbols to transmit antennas and symbol periods, and
wherein determining the space-time code comprises either cycling through multiple space-time codes in the set of space-time codes in a cyclic manner or selecting one of the multiple space-time codes from the set of space-time codes in a pseudo-random manner.

26. The apparatus of claim 25, wherein the at least one processor is operative to determine a space-time code used for each data stream in each time interval from among a set of space-time codes available for the data stream, and to perform space-time decoding for each data stream in each time interval based on the space-time code used for the data stream in the time interval.

27. The apparatus of claim 25, wherein the at least one processor is operative to perform space-time decoding for each data stream based on the set of space-time codes selected for the data stream.

28. The apparatus of claim 25, wherein the at least one processor is operative to select a space-time code for each data stream and perform space-time decoding for each data stream based on the space-time code selected for the data stream.

29. A method comprising:
obtaining at least one received symbol stream from at least one receive antenna; and
performing a space-time decoding on the at least one received symbol stream to obtain at least one space-time decoded symbol stream, wherein the at least one space-time decoded symbol stream is an estimate of at least one data stream transmitted with a dynamic space-time coding, and wherein the space-time decoding is complementary to the dynamic space-time coding;

generating a channel feedback for use when selecting a space-time code set before selecting a space-time code within the selected set, wherein performing the space-time decoding comprises determining a space-time code used for each data stream in each time interval from among a set of space-time codes available for the data stream, wherein a space-time code defines a mapping of symbols to transmit antennas and symbol periods, and wherein determining the space-time code comprises either cycling through multiple space-time codes in the set of space-time codes in a cyclic manner or selecting one of the multiple space-time codes from the set of space-time codes in a pseudo-random manner.

30. The method of claim 29, wherein the performing the space-time decoding comprises determining a space-time code used for each data stream in each time interval from among a set of space-time codes available for the data stream, and performing a space-time decoding for each data stream in each time interval based on the space-time code used for the data stream in the time interval.

31. An apparatus comprising:

means for obtaining at least one received symbol stream from at least one receive antenna;

means for performing a space-time decoding on the at least one received symbol stream to obtain at least one space-time decoded symbol stream, wherein the at least one space-time decoded symbol stream is an estimate of at least one data stream transmitted with a dynamic space-time coding, and wherein the space-time decoding is complementary to the dynamic space-time coding;

means for generating a channel feedback for use when selecting a space-time code set before selecting a space-time code within the selected set, wherein the means for performing the space-time decoding comprises means for determining a space-time code used for each data stream in each time interval from among a set of space-time codes available for the data stream, wherein a space-time code defines a mapping of symbols to transmit antennas and symbol periods, and wherein the means for determining the space-time code comprises either means for cycling through multiple space-time codes in the set of space-time codes in a cyclic manner or means for selecting one of the multiple space-time codes from the set of space-time codes in a pseudo-random manner.

32. The apparatus of claim 31, wherein the means for performing the space-time decoding comprises means for determining a space-time code used for each data stream in each time interval from among a set of space-time codes available for the data stream, and means for performing a space-time decoding for each data stream in each time interval based on the space-time code used for the data stream in the time interval.

33. A non-transitory computer-readable medium comprising executable instructions for:

generating at least one data stream; and performing a space-time coding on the at least one data stream in a dynamic manner to generate at least two output streams for transmission from at least two antennas to a terminal;

wherein performing the space-time coding comprises selecting a set of space-time codes from among multiple sets of space-time codes based on a channel profile from the terminal, wherein the space-time coding further comprises selecting a space-time code after selecting the set by either cycling through multiple space-time codes in the selected set of space-time codes in a cyclic manner or selecting one of the multiple space-time codes from the selected set of space-time codes in a pseudo-random manner;

wherein each set of space-time codes includes multiple space-time codes;

wherein each space-time code defines a mapping of symbols to transmit antennas and symbol periods; and wherein the channel profile is indicative of long-term characteristics of a wireless channel from an apparatus to the terminal.

\* \* \* \* \*